Jan. 20, 1942. C. J. KINZIE ET AL Re. 22,011

METHOD OF MAKING ENAMELWARE

Original Filed Nov. 10, 1938 2 Sheets-Sheet 1

INVENTORS
CHARLES J. KINZIE AND
CHARLES H. COMMONS, JR.
BY
Beau, Brooks, Buckley & Beau.
ATTORNEYS INVENTORS
CHARLES J. KINZIE AND
CHARLES H. COMMONS, JR.
BY
Beau, Brooks, Buckley & Beau.
ATTORNEYS Reissued Jan. 20, 1942 Re. 22,011

UNITED STATES PATENT OFFICE 22,011

METHOD OF MAKING ENAMELWARE

Charles J. Kinzie and Charles H. Commons, Jr., Niagara Falls, N. Y., assignors to The Titanium Alloy Manufacturing Company, New York, N. Y., a corporation of Maine Original No. 2,249,007, dated July 15, 1941, Serial No. 239,772, November 10, 1938. Application for reissue October 22, 1941, Serial No. 416,134

19 Claims. (Cl. 91—73)

Figure 1:
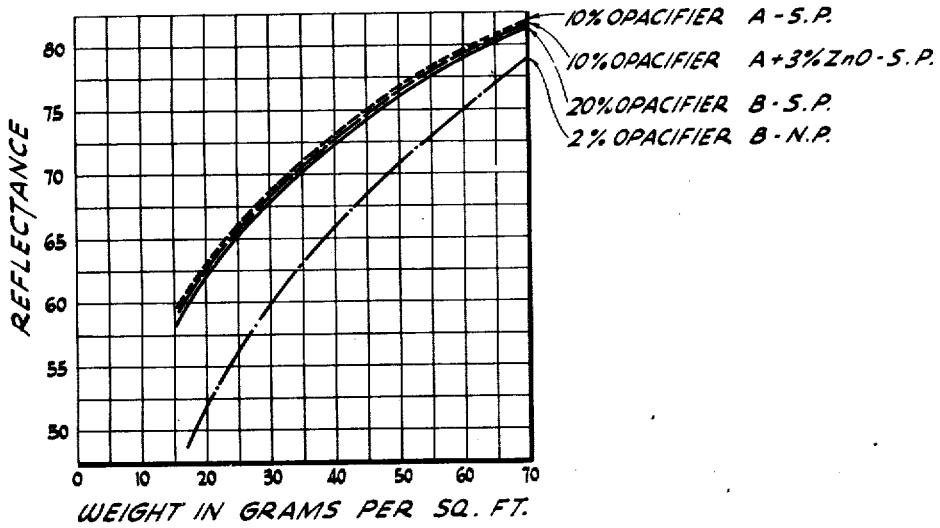

Our invention relates to the production of improved coatings of white enamels and glazes on sheet metal, more particularly vitreous enamels on a sheet iron base.

We have discovered a novel process of enameling iron, particularly sheet iron, whereby heretofore unknown and advantageous results in vitreous enamel coatings are attained. One feature of our improved enameling methods consists in the discovery that certain zirconium oxides and other opacifiers can be used as mill addition opacifiers in percentages considerably higher than heretofore, with unexpected beneficial results in the enamelware produced.

The opacifiers tested in the practice of this invention are as follows:

*Opacifier A.*—The zirconium oxide opacifying composition described in the pending application for patent filed by Charles J. Kinzie November 1, 1938, Serial No. 238,139, which composition consists of over 98% $ZrO_2$ crystals essentially free from alkali-metal compounds and is of particle size range of 0.40 to 0.90 micron intimately associated with a dried gelatinous zirconium precipitate.

*Opacifier B.*—The zirconium oxide white opacifying composition described in Example B of U. S. Patent No. 2,102,627 of December 21, 1937. This opacifier contained 88.06% $ZrO_2$.

*Opacifier C.*—A high grade tin oxide containing in excess of 99% $SnO_2$ and of the grade usually used in modern tin oxide enamel opacifying.

*Opacifier D.*—The zirconium oxide opacifier described in U. S. Patent No. 1,588,476 of June 15, 1926, to Kinzie, representing the most successful commercial zirconium oxide opacifier up to quite recent times.

*Opacifier E.*—This consists of a mixture of 75 parts by weight zirconium oxide, Opacifier A, and 25 parts by weight of zinc oxide, the latter being essentially free from load and sulfur and sulfates.

*Opacifier G.*—A type of zirconium oxide opacifying material with an appreciable silica content and containing 1 to 2% of water rather firmly fixed by the zirconium or zirconium and silica. This $H_2O$ is released at enamel firing temperatures, and produces a $H_2O$ gas bubble opacity in addition to that produced by the zirconia complex.

*Opacifier H.*—Titanium dioxide of the grade generally used as a paint pigment. This material is the most powerful of the paint pigments in pigmenting effects. In enamel manufacture it is often used in the frit batch, due to the fact that it is a flux in silicate melts, and has the effect of lowering the melting point of the melt and in many cases has a specific effect on the degree of acid resistance of enamelware made from frits containing the same.

*Opacifier I.*—Cerium oxide. This material is used to a limited extent as a mill addition opacifier. In some enamels percentages of 6% are as effective as 6% tin oxide.

The reflectance values for each enamel were determined by means of a reflectometer, and are shown in graphical form in the drawings, with the percentage mill additions for each opacifier also charted to show the reflectance results of each test. The term reflectance is used to conform with modern nomenclature, and in this case may be taken to indicate the degree of opacity or covering power. The visual results as seen by the eye conform to the reflectance readings in this series as shown.

Figure 2:
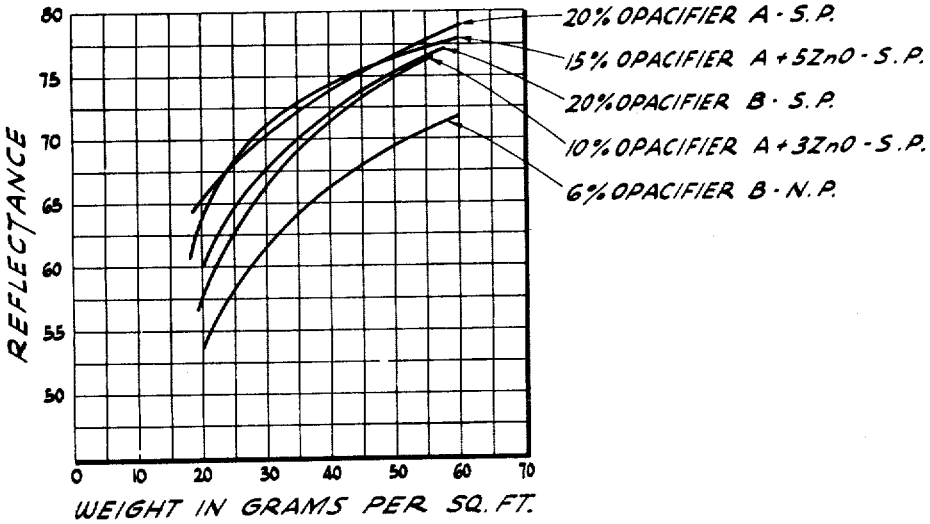
Figure 3:
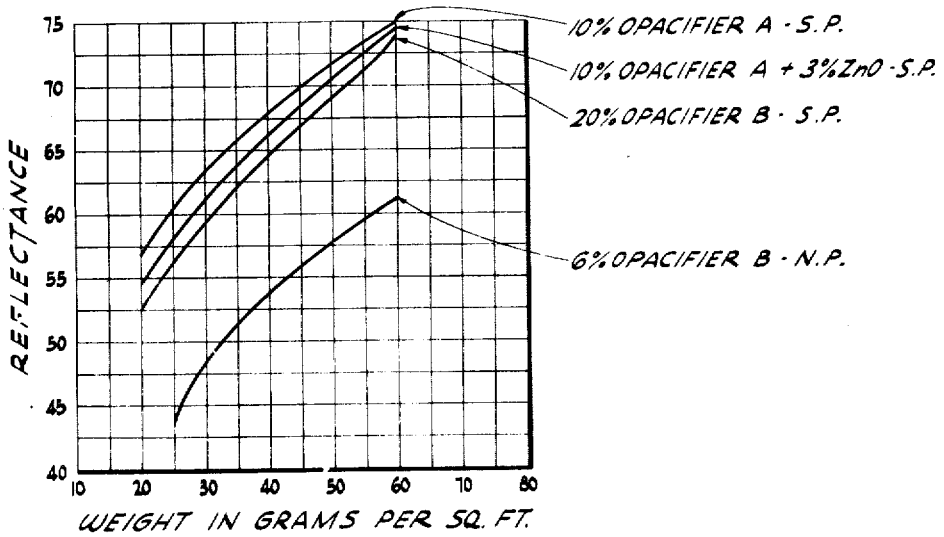
Figure 4:
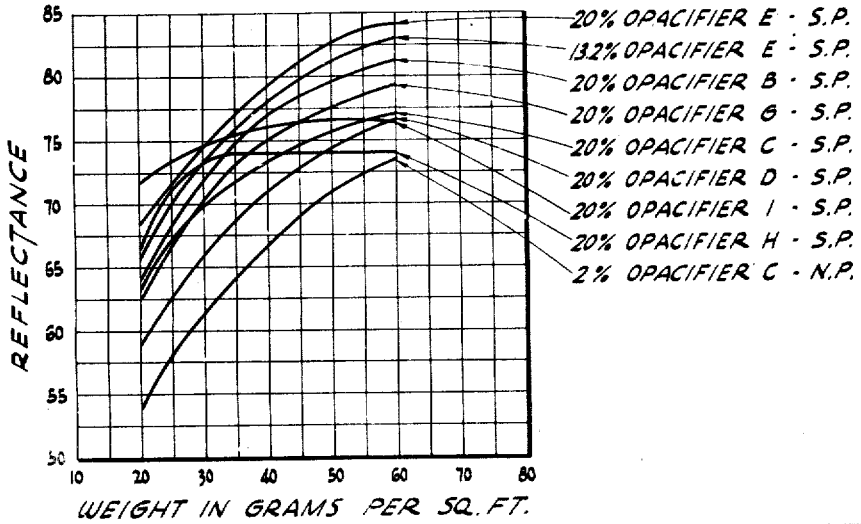

In the drawings, Figure 1 is a graphical presentation of the reflectance figures for the enamels described in Example 1. Figure 2 is a graphical presentation of the reflectance figures for the enamels described in Example 2. Figure 3 is a graphical presentation of the reflectance figures for the enamels described in Example 3. Figure 4 is a graphical presentation of the reflectance figures for the enamels described in Example 4. In the graphs, the letters A, B, C, D, E, G, H and I refer to the opacifiers similarly identified hereinafter. The letters "S. P." refer to enamels produced in accordance with the present invention, while the letters "N. P." refer to enamels produced in accordance with prior art methods.

In view of the fact that information available to the trade is based on enameling tests with either tin oxide or zirconium oxide D or zirconium oxide B in percentages up to about 5 or 6%, it is not surprising that the effectiveness of zirconium oxide B in the higher percentages has not until this time been discovered, and the import of such discovery in developing a new enameling technique has not until this time been disclosed.

In modern enameling, the practice is to add not in excess of about 3% of the opacifier at the mill along with clay, water, etc. to a so-called superopaque frit, mill the charge to about 6 to 12 grams residue on a 200 mesh sieve from a 100 cc. slip, and apply the slip in two coats at a total rate of from 55 to 65 grams per square foot. In one coat practice, the mill addition opacifier is increased to from 4 to 6%, milled to the same fineness, and is applied at the rate of about 45 to 50 grams per square foot in one coat. Reflectance results ranging from 68 to about 72 are possible at these rates of application in modern practice.

With the foregoing background, we decided that enameling results could be improved by taking advantage of the fact that zirconium oxides, such as those identified above as Opacifiers A and B, are capable of continuing to increase opacity when used as an addition at the mill in amounts of over 5% and so produce enamelware with the desired reflectance with low enamel application rates. Accordingly, we made millings with 10 to 15% and 20% of zirconium oxide B, along with 7% clay, ¼% magnesium carbonate and water, to the fineness as in regular commercial use. Upon applying the enamel slip to ground-coated sheet iron and firing the same, however, we found that the surface was not passable, the enamel had not smoothed out, doubtless due to the effect of the refractory $ZrO_2$ adjacent to the frit particles in rendering the same more refractory, with the result that these enamels did not smooth out to the lustrous finish obtained with an enamel of the same degree of fineness but having a lower opacifier addition.

After a considerable amount of tests and experimentation, we found that if the frit in the charge carrying the high zirconium oxide B opacifier addition was reduced by milling to a particle size considerably finer than normally used, or to a point where over 95% by weight of all the frit particles were at or below 44 microns in size, such an enamel slip could be sprayed onto metalware in exceedingly thin coatings and fired to highly lustrous surfaces having high reflectance with a white color and a degree of resistance to mechanical abuse far in excess of any enamel produced by modern methods. We also were surprised to find by calculations that the high mill addition opacified enamel in thin coats was more economical, and that in comparing the raw material costs of our improved methods on the basis of equal reflectance with present practice, our new process gave a lower raw materials cost per square foot.

We also found that with zirconium oxide B, mill additions of 20 parts by weight of this oxide to 100 parts of frit were most effective in the low rates of application. Fifteen parts by weight were not sufficient, and twenty-five parts by weight did not increase opacity enough to warrant the added amount. We further found that mill additions of 10 parts by weight of zirconium oxide A gave reflectance results at least equivalent to 20 parts by weight of zirconium oxide B. There appeared no reason for using much more than 10 parts $ZrO_2$ Opacifier A to 100 parts of frit in this new process, since this new zirconium oxide is outstanding in its unique opacifying effects when used in our improved methods.

We also discovered that the addition of a percent or so of zinc oxide which is free of sulfur and lead compounds assisted in the working of our process by making the enamel less refractory, and also enabled certain enamels to fire down to smoother, more lustrous coatings. However, the use of zinc oxide at the mill is optional.

The following examples will fully set forth our invention and discovery whereby enamelware can be produced with heretofore unknown thin coatings with high opacity and greatly improved mechanical strength along with increased economy in manufacture.

Example 1

The frit used is a so-called superopaque frit heavily opacified with antimony compounds, and is of the type now commonly used to produce opaque results at application rates of 45 to 65 grams per square foot in one and two coats, and with mill additions of from 2 to 4 percent tin oxide or zirconium oxide type B.

*Enamel formula—Raw batch (parts by weight)*

| | |
|---|---|
| Feldspar | 49.70 |
| Quartz powder | 5.60 |
| Borax | 28.42 |
| Sodium nitrate | 5.00 |
| Sodium carbonate | 4.87 |
| Cryolite | 1.20 |
| Sodium antimonate | 16.00 |
| Fluorspar | 5.00 |
| Zinc oxide | 2.40 |
| Calcium carbonate | 1.78 |
| Titanium oxide | 4.00 |
| Sodium silico fluoride | 4.00 |

The raw materials are well mixed and charged to the enamel frit melting furnace at a temperature of about 2150° F., and melted down to the point where the raw materials combine to form a uniform melt which is poured into water to quench and form the frit which is then dried. Such frit is of the following calculated composition:

| | Percent |
|---|---|
| $Na_2O+K_2O$ | 19.19 |
| $CaF_2$ | 4.68 |
| $Na_3AlF_6$ | 1.12 |
| ZnO | 2.25 |
| $Sb_2O_5$ | 12.56 |
| $B_2O_5$ | 9.74 |
| $SiO_2$ | 37.16 |
| $TiO_2$ | 3.74 |
| $Al_2O_3$ | 8.62 |
| CaO | 0.94 |
| | 100.00 |

Using this frit four separate millings were prepared as follows:

| | Milling numbers | | | |
|---|---|---|---|---|
| | 11 | 12 | 13 | 14 |
| Frit | 100 | 100 | 100 | 100 |
| Zinc oxide | ---- | ---- | ---- | 3 |
| Zirconium oxide A | -- | 10 | -- | 10 |
| Zirconium oxide B | 2 | ---- | 20 | ---- |
| Enameler's clay | 7 | 7 | 7 | 7 |
| Water | 40 | 43 | 43 | 43 |

Mill mix No. 11 was milled to a fineness of 10 grams residue on a 200 mesh sieve from a 100 cc. sample to represent the normal enameling practice with this type frit. Mill mix Nos. 12, 13 and 14 of this example were milled to a point of fineness where nearly all the frit particles were under 44 microns in size, or as expressed by sieve fineness test a residue of 1 gram +325 mesh from a 100 cc. sample.

Using each of the four slips, enamel specimens were prepared by spraying on the enamel at rates of application from about 17½ grams per square foot up to about 62½ grams per square foot in steps of 20, 30, 40, 50, 60, etc., all in single coat application over a dark ground coat on 6" x 4" panels carefully weighed before and after application. The panels were fired at 1520° F. for 2½ minutes. Reflectance readings were made for each panel in the series, and from these readings the Figure 1 graphical presentation of the results was charted—enamel rate per square foot against reflectance.

As regards reflectance, Figure 1 will be self-explanatory, and the opacity differences as noted by visual observation are in general in the order of the illustrated reflectance results. In the enamels Nos. 12, 13 and 14, good results as to texture, surface and lustre were obtained at all rates of application, while in No. 11, the prior normal enameling practice, when the rate was less than 45 grams per square foot, the surface was not good.

It will be seen from the graph shown in Figure 1, that for any point of equal reflectance, much less of the present highly mill addition opacified enamel is required. Using the mill mixtures as a basis for cost calculations and rates of application to equal reflectance, millings Nos. 12, 13 and 14 produce enamel ware at a raw materials cost below that of the prior normal practice of milling No. 11. We also observed that the enameled specimens using millings Nos. 12, 13 and 14 carrying enamel at the rate of about 30 grams per square foot would stand nearly twice as much flexing of the sheet metal as compared with the prior normal process enamel No. 11 applied at the 50 grams per square foot rate. We also observed that when the steel was distorted by a ball under pressure that the 30 grams per square foot applications of enamels Nos. 12, 13 and 14 showed only slight fracturing, while the 50 grams per square foot application of No. 11 was badly fractured, the enamel detaching over a large area. Therefore, in addition to the procurement of desired opacity or reflectance at a low rate of application, the resultant enamel finish is superior in mechanical strength and adherence and hence will stand considerably more abuse. This matter of thin films with improved strength has been a long-felt want on the part of enamelers and users of enamel ware, but heretofore it has been impossible of attainment, since no process was known by which sufficient opacity could be obtained along with high lustre and other desired properties.

Example 2

The frit prepared and used in this example was an antimony free zirconium composition of the following formula:

*Batch formula—Parts by weight*

| | |
|---|---|
| Pyrophyllite | 36.06 |
| Borax crystals | 36.10 |
| Fluorspar | 5.65 |
| Zirconium silicate −325 mesh | 16.53 |
| Zinc oxide | 7.18 |
| Cryolite | 7.35 |
| Quartz powder | 6.03 |
| Sodium nitrate | 4.10 |
| Sodium carbonate | 4.15 |
| | 123.15 |

The batch was well mixed and then smelted in a frit furnace and poured into water to quench, and the resulting frit was then dried. The calculated melted composition of this enamel frit was as follows:

| | Percent |
|---|---|
| $Na_2O+K_2O$ | 13.07 |
| $CaF_2$ | 5.65 |
| $ZnO$ | 7.18 |
| $Al_2O_3$ | 10.44 |
| $ZrO_2$ | 10.75 |
| $SiO_2$ | 37.40 |
| $B_2O_3$ | 13.21 |
| $F_2$ | 2.30 |
| | 100.00 |

Using this frit, the following millings were made:

| | Milling numbers | | | | |
|---|---|---|---|---|---|
| | 21 | 22 | 23 | 24 | 25 |
| Frit | 100 | 100 | 100 | 100 | 100 |
| Enameler's clay | 6 | 6 | 6 | 6 | 6 |
| Zirconium oxide opacifier B | 6 | 20 | | | |
| Zirconium oxide opacifier A | | | 20 | 10 | 15 |
| Zinc oxide | | | | 3 | 5 |
| Water | 40 | 43 | 43 | 43 | 43 |

Milling No. 21 was milled to a fineness of 10 grams residue on a 200 mesh sieve from a 100 cc. sample, while millings Nos. 22, 23, 24 and 25 were each milled to a fineness where more than 95% by weight of the frit particles were 44 microns or smaller, or a residue of about one gram +325 mesh from 100 cc. of slip.

Using each slip, panels were prepared by spraying the enamel over a dark ground coat using 6'' x 4'' panels at single cover coat application rates varying from about 20 to 60 grams per square foot. The panels were fired at 1520° F. for 2½ minutes, cooled, and then the reflectance was determined on each. The reflectance results of the series are set forth in Figure 2 which shows the reflectance at the different rates of application for each of the five enamels. The observations as to apparent covering power or opacity when the panels were examined visually appear generally of the same order as expressed by the percent reflectance of Figure 2. All five enamels had good surfaces. Nos. 24 and 25, in particular, had brilliant surfaces and were very resistant to scratching and wear.

Viewed from the standpoint of economy, the process of enameling as presented by millings Nos. 22, 23, 24 and 25 of this Example 2, represents considerably greater advantages when compared with Example 1, due to the fact that the frit is considerably lower in cost. The enamels are superior from the standpoint of having greater lustre, smoother and more brilliant surfaces, and have considerably greater resistance to scratching and abrasion than any enamel of the Example 1 series.

This frit of Example 2 is not particularly opaque in the frit stage, but certain ingredients in the frit appear to cooperate with the mill added zirconia in developing a degree of opacity hardly to be expected from a frit of its appearance. It is believed that the mill added zirconia acts as an exciter or catalyst, thereby causing the crystallization of opacifying particles to separate in the frit during the firing on of the enamel, and this opacity along with that of the mill added zirconia explains the high degree of opacity finally existing in the fired enamel.

Example 3

Example 3 represents the adaptation of our new enameling process to an enamel of the acid-resisting type.

The following batch of raw materials was well mixed and then smelted to a homogeneous melt which was poured into water and the resulting frit was dried.

*Batch formula—Parts by weight*

| | |
|---|---|
| Sodium nitrate | 8.4 |
| Antimony oxide | 16.2 |
| Phosphate rock | 5.8 |
| Titanium oxide | 19.0 |
| Quartz powder | 59.4 |
| Sodium carbonate | 25.0 |
| Borax | 51.2 |
| Sodium silico fluoride | 15.0 |

The frit was of the following calculated composition:

| | Percent |
|---|---|
| $Na_2O$ | 20.2 |
| CaO | 1.8 |
| $Sb_2O_5$ | 10.5 |
| $SiO_2$ | 41.8 |
| $B_2O_3$ | 12.1 |
| $TiO_2$ | 12.3 |
| $P_2O_5$ | 1.3 |
| | 100.0 |

Using this acid-resisting frit, the following millings were made:

| | Milling numbers | | | |
|---|---|---|---|---|
| | 31 | 32 | 33 | 34 |
| Frit | 100 | 100 | 100 | 100 |
| Enameler's clay | 2 | 2 | 2 | 2 |
| Setting up powder for slip* | 3 | 3 | 3 | 3 |
| Zirconium oxide opacifier B | 6 | 20 | | |
| Zirconium oxide opacifier A | | | 10 | 10 |
| Zinc oxide | | | | 3 |
| Water | 40 | 43 | 43 | 43 |

*The powder referred to is a setting up and suspending agent and is described in Example C of U. S. Patent No. 1,988,800 of January 22, 1935.

In mix No. 31, the milling was as for normal practice, namely, to a fineness of about 10 grams residue on 200 mesh sieve from a 100 cc. sample of slip. In mixes Nos. 32, 33 and 34, the mixes were milled to a point where nearly all the frit particles were 44 microns or finer, and expressed in sieve test terms a residue of ½ of 1 percent remained on a 325 mesh sieve from the 100 cc. slip.

Using each of these slips and 6" x 4" dark ground coated panels, the enamel was applied a various rates in one coat only and the specimens fired at 1520° F. for 2½ minutes. Reflectance readings were taken for each enameled specimen, and the percent reflectance for each of the four enamels at various application rates are shown graphically on the accompanying Figure 3. The observations as to apparent opacity are generally of the same order as of the reflectance percentages found.

We do not confine this invention to the particular types of zirconium oxide opacifiers referred to, nor do we confine it only to zirconium oxides, but wish to embrace the use of other possible materials having the properties of and used as mill addition opacifiers. We have made tests with high percentages of a number of such mill addition opacifiers in our new process, as shown in the following example.

EXAMPLE 4

In this series of tests we used a frit of the superopaque type of enamel frits for use on sheet iron. An analysis of this frit shows it to be heavily opacified with antimony compounds and more or less of the same composition as the frit used in Example 1, except that no titanium was present and the antimony content was a percent or two lower. This frit, although of the superopaque type, does not yield quite as high opacity in this process as do the frits of Examples 1 and 2, but is high enough to be entirely practical in our process.

With this superopaque frit we made millings using:

| | | |
|---|---|---|
| Frit | 100 | |
| Enameler's clay | 7 | |
| Opacifier | 20 | —or otherwise as indicated in Figure 4 |
| Water | 43 | |

Each charge was milled to a fineness of practically all minus 44 microns. A series of 6" x 4" sheet iron panels was prepared in one coat at various application rates. Readings were made for each, and these reflectance readings are presented in graphical form in Figure 4. Various ones of the previously listed opacifiers were tested, with the following comments as to color, lustre and other results:

*Opacifier B (zirconium oxide)*.—20% of this material gave good results as to reflectance, lustre and color and worked well throughout the enamel process.

*Opacifier C (tin oxide)*.—The reflectance imparted by tin oxide was higher than zirconium oxide D, but not as high as zirconium oxide B. The lustre was lower in the case of the tin oxide enamel specimen. As to color it was found that the tin oxide enamel was too much of an ivory in color and could not be classed as a white in comparison with enamels in which either zirconium oxide B or D were used.

*Opacifier D (zirconium oxide)*.—This gave an enamel with very good lustre and white color and worked well in the process, but does not yield as high reflectance as did zirconium oxide Opacifier B.

*Opacifier E (zirconium oxide plus zinc oxide)*.—20% mill addition results show this opacifier to be the most powerful of this series as regards reflectance excepting cerium oxide enamel below the 30 gram rate. The color was good and the lustre fairly good. Since there is no point in using such a high percentage of this product, a milling was made with 13.2% and the reflectance results are included as to reflectance in the rates up to about 30 grams per square foot. 13.2% Opacifier E gave a higher reading than any other opacifier in this series excepting titanium oxide or cerium oxide. Above 30 grams per square foot rates, 13.2% Opacifier E excelled the 20% addition of all others. The 13.2% of Opacifier E gave an enamel of excelling lustre, white color, fine surface and texture, and the enamel behaved in excellent manner throughout the process. The opacity is a function of the zirconium oxide present plus the enamel frit opacity, while the zinc oxide assists in producing a highly lustrous surface.

*Opacifier G (zirconium oxide)*.—In normal enamel practice where up to 6% of this product is used at the mill, the resulting enamel lustre is lowered. As will be seen, a 20% mill addition of this opacifier produced reflectance results above those for zirconium oxide type D and below those for zirconium oxide type B. The lustre of enamels containing 20% Opacifier G was very poor in all cases, and there developed serious defects in enameling, particularly a tearing of the film during the operation. The Opacifier G opacity was fairly good.

*Opacifier H (titanium oxide).*—Normally this oxide of titanium is not used at the mill except in low percentages of 1 to 2% to improve the lustre, and not as an opacifier, since it goes into solution readily during the firing on of the enamel film. We tried this $TiO_2$ as a 20% addition in our new process. The Figure 4 reflectance results show that, in the application rate up to 30 grams per square foot, the $TiO_2$ was very effective in increasing the reflectance, and that at higher rates this $TiO_2$ in this enamel did not vary in reflectance, being unusual in this respect. The enamels were entirely matte non-lustrous surfaces above 30 grams per square foot, with only a fair lustre at lower rates. The color was of a yellow order and not white. While zirconium oxide as a mill addition in enamel produces a white opacity in all types of enamels, titanium oxide seldom does. The color effect will vary depending on the composition of the enamel frit, the mill additions, and the treatment received in the processing, etc. In the case of the 20% mill addition of $TiO_2$ in this example, a considerable amount of the $TiO_2$ must have dissolved to form a glass of high index of refraction with the separation of crystalline compounds to form the matte surface obtained.

*Opacifier I (cerium oxide).*—The reflectance results with 20% of cerium oxide Opacifier I are shown in Figure 4. In reflectance results the behavior of this material was similar to titanium oxide, but cerium oxide produced enamels of fairly good lustre at all rates, although there was some film tearing on the panels. Cerium oxide is rather soluble in glasses, enamels, etc. and like the $TiO_2$ this cerium oxide must have dissolved to a considerable extent, thereby increasing the index of refraction of the glass and apparently making the enamel more refractory. In color the enamels containing this cerium oxide were bluish or gray white in color tone, and the enamels were easily scratched.

For purposes of comparison, Figure 4 carries a curve showing the effect of this particular enamel when milled to the prior normal fineness with a mill addition of 2% tin oxide.

These experiments with various mill addition opacifiers serve to prove that the most efficient material is the zirconium oxide A type opacifier, and that zirconium oxides B and D are next in importance in respect to enamel lustre, whiteness of color, and opacity. Nevertheless they show that certain other types of material do function to a certain extent. Hence we include such substances within the scope of our improved process, since in certain classes of ware, the whiteness of color and high lustre may be secondary, and possibly the defects observed in certain of these materials, such as tearing of the film might be overcome. Hence we include in this process of enameling opacifying mill additions such as tin oxide, titanium oxide and cerium oxide.

The oxides of hafnium and thorium are known to be stable white refractory oxides having a relatively high index of refraction and generally close to zirconium in properties. These oxides are of interest in our improved process, but their cost is prohibitive at the present time.

Most of the commercial white vitreous enameling on sheet iron involves the use of a dark colored ground coat usually applied by dipping and draining at the rate of 18 grams per square foot of surface when fired. These dark ground coats have practically no reflectance and reflectance readings may vary from nearly 0 to about 7. The reason we have referred to such dark colored ground coats as being used in our process is that these coats are in commercial use at the present time.

However, we do not limit our invention to the application of our enamel over a conventional dark colored ground coat. For example, our new process of superopaque vitreous enameling could be used in conjunction with the enamel for direct application on metal disclosed in U. S. Patent No. 1,944,938 to Kinzie. By using the slip prepared according to the Example A formula and procedure of this U. S. Patent No. 1,944,938 and applying the slip directly to the prepared iron base at the rate of about 25 grams per square foot surface, firing this and applying our new process enamel such as milling No. 24 at the rate of 20 grams per square foot, we produce white vitreous enamel in the superopaque white class with an extremely low rate of application.

There is also in use, particularly in the vitreous enameling of sheet iron culinary ware, a process in which the iron shape is first coated with a light colored ground coat having some opacity and a reflectance of about 25. Over this ground coat is applied a more opaque enamel in one coat, but the finish coat enamels up to this time have not been opaque enough. For first class ware it has been necessary to apply two cover coats over the light colored ground coat. We will now illustrate a case in which we apply our new process to such a ground coat.

Example 5

The ground coat frit is prepared by mixing and then melting the following batch, pouring the melt into water to produce the frit:

*Batch formula—Parts by weight*

| | |
|---|---|
| Feldspar | 32.0 |
| Borax | 34.3 |
| Quartz powder | 18.0 |
| Fluorspar | 4.3 |
| Calcium carbonate | 2.2 |
| Sodium nitrate | 2.4 |
| Soda ash | 6.7 |
| Cobalt oxide | 0.1 |

The calculated composition of the frit was:

| | Percent |
|---|---|
| $Na_2O+K_2O$ | 19.46 |
| $CaF_2$ | 5.47 |
| CaO | 1.57 |
| $Al_2O_3$ | 7.79 |
| $SiO_2$ | 49.40 |
| $B_2O_3$ | 16.00 |
| CoO | 0.13 |
| | 100.00 |

100 parts of this frit were milled with 7 parts of enameler's clay, 6 parts of zirconium oxide Opacifier D, 0.25 part of magnesium carbonate, and 0.10% part of sodium nitrite, all milled to a fineness of 8 grams residue on a 200 mesh sieve from 100 cc. sample. This slip was applied so as to produce 23 grams of enamel per square foot surface when fired at 1540° F. for 2½ minutes. This light colored ground coat had what might be described as an opalescent appearance, and had a reflectance reading of 16. A coating of milling No. 24 was applied and fired at 1520° F.

for 2½ minutes yielding a fired coat of 21.6 grams per square foot. This enamel was of a degree of whiteness and apparent opacity equal to the so-called white enamel cooking ware having twice the weight of enamel on the iron. The reflectance reading was 58.3.

In another test in the same light colored ground coat, a coating of milling No. 24 was applied and fired at 1520° F. 2½ minutes to yield 29.4 grams of enamel per square foot over the ground coat. This enamel had a reflectance reading of 64.8, and was of an order of whiteness and opacity desired in high quality ware. The lustre was high and the surface excellent for each rate of application.

Economy, improved quality as to mechanical strength, along with excellence as to finish, are possible by this method.

In enamel practice, it is common to add certain electrolytes to increase the set of enamel or in some cases to decrease it. So in our improved process we may, if necessary, resort to such use of small amounts of electrolytes, but usually the characteristics of the slips, particularly those opacified with zirconium oxides A, B and D, are such that little or no additions are required. Where required it appears that from ¼ to ½ of one part by weight of sodium nitrite to each 100 parts of frit used is an advantageous addition.

For reflectance study purposes, the various enamels were applied by spraying with the use of a spray gun and nozzles of the type and size commonly used in the spraying of organic coatings such as paints and lacquers. The prior normal millings (Nos. 11, 21 and 31) were applied by use of the usual type of spray gun used for vitreous enamel slips.

We do not confine such enamel applications, however, to the spraying method. Excellent enameling results have been obtained by the tong dipping method commonly used in the vitreous enameling or iron culinary ware. Excellent results have been obtained by dipping, for instance in acid-resisting enamels of the type illustrated in millings Nos. 32, 33 and 34, and particularly Nos. 33 and 34. Where the acid resistance is not required to be complete, the dipping process gives good results with millings Nos. 22 to 25, and particularly No. 24, for culinary ware and other types of enamel practice where the slip is customarily applied by the dipping process. Fine opaque white lustrous enamel results have thereby been produced in one thin coat over the dark ground coat, the single cover coating being applied at rates of 20 to 30 grams per square foot, while in comparison the normal practice is to deposit enamel at from 45 to 80 grams per square foot to obtain sufficient coverage in enamelware for culinary usage.

We do not limit ourselves to the particular enamel frits set forth in these examples, as obviously many other enamel formulae may be used in making frits satisfactory for this process, and in fact we have tried the process in at least twelve different enamel frits with successful results as to coverage when our new high opacity fine milling process is used. Among the enamel frits which are satisfactory for our new and improved process are opaque white frits which when milled 100 parts by weight of frit, 6 parts by weight vallendar clay, 0.25 part by weight of magnesium carbonate, 40 parts by weight of water to a fineness of 12 grams residue on a 200 mesh sieve from a 100 cc. sample applied to ground coated sheet iron in two coats at a total of 72 grams per square foot, will have a reflectance of about 60. Preferably a reflectance reading of 70 or above is desired. (See Reflectance Test for Opaque White Vitreous Enamels—published March, 1937, by Tech. Research Section Educational Bureau Porcelain Enamel Institute—612 N. Michigan Ave., Chicago, Ill.)

We do not wish to limit the process to the particular proportions of frit, opacifier and other mill additions. We have, for instance, made millings to about 20 microns of frit particles with as high as 40 percent $ZrO_2$ opacifier at the mill with interesting laboratory enameling results and high degree of opacity at rates as low as 8 grams per square foot. This is a possible development commercially for this process when the technique of application is understood to a degree greater than at present. Commercially there appear to be certain lower limits to the rate of application, mainly due to the dark ground coating practice used as well as to the equipment available for handling the process. At the moment our efforts commercially are to replace the present normal process of one cover coat application at the rate of 45 to 50 grams per square foot by our new process in one coat at the rate of 25 to 35 grams per square foot, and to replace present normal two cover coat practice of about 60 to 80 grams per square foot, either by one coat by our new process at the rate of about 30 to 40 grams per square foot or in some cases apply our heavily mill opacified finely milled enamel in two coats, the first coat at about 20 to 25 grams per square foot and a finish coat of from 15 to 10 grams per square foot. Our improved processes therefore are not strictly limited to a single cover coat application, but have been practiced with outstandingly good results in two very thin coats; this latter method must be resorted to in some types of work where extra high quality is required as to freedom from enamel defects.

We have also found zirconium oxide of the types referred to as Opacifiers A, B and D yield superior results by this new process when compared with other available mill addition opacifiers as to resultant opacity, lustre, whiteness and general process workability. We prefer the types A and B, but zirconium oxide opacifier type D should not be overlooked, in view of the fact that it yields enamel of very high lustre, white color and excellent workability. More of it must be used than is the case of either A or B type opacifiers.

Reasonably satisfactory mill addition opacifiers are those which can be used in the high percentages to produce lustrous opaque white enamel finishes at rates of about 10 grams per square foot up to about 40 grams per square foot. Such mill addition opacifiers can be described as extremely fine powders having a refractive index above 1.8, preferably above 2.00, which are stable or essentially so in contact with the fused enamel frit particles during the firing of the enamel onto the ware, and also capable of being used in such amounts at the mill so as to produce opaque vitreous enamel coatings having a reflectance of more than 70 when applied at a rate of 40 or less grams per square foot.

We prefer, however, to use a heat stable white dioxide of any element of the fourth group of Mendeleefs Periodic System which forms no oxide lower than the dioxide. Only zirconium, hafnium and thorium fulfill these requirements, since the dioxides of titanium, tin, etc. are reduced to lower dark-colored oxides when subjected to reducing conditions. While such reducing conditions are not generally met with in vitreous enameling practice, they can occur, and our aim is to establish conditions in the procedure which will be least likely to cause discoloration. Since hafnium is relatively rare and prohibitive as to price, and since thorium is also extremely high in price, the dioxide of zirconium remains as the preferred dioxide and particularly in the forms as referred to as opacifiers A, B and D which we have found to be suitable for this process.

Paint pigment oxides such as zinc oxide and lead oxides, although having a relatively high index of refraction, are ineffective primary opacifiers in our process, since these oxides are powerful fluxes, combining avidly with the enamel to form more fluid glasses. For this reason a certain amount of such material added at the mill is in certain cases desirable not from the opacity standpoint, but because such addition renders the coating less refractory and more readily fused down to a lustrous smooth finish.

Where parts and percentages are mentioned, parts by weight are understood.

We claim:

1. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a basic reflectance above 60, clay, water and not less than 10 parts by weight of an opacifier selected from the dioxides of the group consisting of zirconium, tin, titanium, hafnium, thorium and cerium, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

2. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a basic reflectance above 60, clay, water and from about 10 to 20 parts by weight of an opacifier selected from the dioxides of the group consisting of zirconium, tin, titanium, hafnium, thorium and cerium, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

3. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a basic reflectance above 60, clay, water and not less than 10 parts by weight of zirconium dioxide, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

4. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a basic reflectance above 60, clay, water and from about 10 to 20 parts by weight of zirconium dioxide, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

5. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a basic reflectance above 60, clay, water and not less than 10 parts by weight of zirconium dioxide and from 3 to 5 parts of zinc oxide essentially free from lead and sulfur compounds, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

6. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a basic reflectance above 60, clay, water and from about 10 to 20 parts by weight of zirconium dioxide and from 3 to 5 parts of zinc oxide essentially free from lead and sulfur compounds, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

7. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a high aluminum and zirconium content, clay, water and not less than 10 parts by weight of an opacifier selected from the dioxides of the group consisting of zirconium, tin, titanium, hafnium, thorium and cerium, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

8. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a high aluminum and zirconium content, clay, water and not less than 10 parts by weight of zirconium dioxide, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

9. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a high aluminum and zirconium content, clay, water and not less than 10 parts by weight of zirconium dioxide and from 3 to 5 parts of zinc oxide essentially free from lead and sulfur compounds, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

10. In the method of making white vitreous enamel ware having a coating less in weight than 40 grams per square foot and a reflectance above 70 and substantially greater than that producible with the frit used and clay alone, the steps which consist in milling a white high aluminum and zirconium containing frit mixed with from 10 to 20 parts by weight of zirconium dioxide to 100 parts of said frit in water, said mixture being ground to particle fineness of less than 44 microns to form the enamel slip, and applying said slip to said ware which upon drying and firing will produce aforesaid white vitreous coating having a zirconium dioxide content of more than 16 percent.

11. In the method of making white vitreous enamel ware having a coating less in weight than 40 grams per square foot and a reflectance above 70 and substantially greater than that producible with the frit used and clay alone, the steps which consist in milling a white high aluminum and zirconium containing frit mixed with from 10 to 20 parts by weight of zirconium dioxide and from 3 to 5 parts of zinc oxide essentially free from lead and sulfur compounds to 100 parts of said frit in water, said mixture being ground to particle fineness of less than 44 microns to form the enamel slip, and applying said slip to said ware which upon drying and firing will produce aforesaid white vitreous coating having a zirconium dioxide content of more than 16 percent.

12. In the method of making white vitreous enamel ware having a coating in weight of about 30 grams per square foot and a reflectance above 70 and substantially greater than that producible with the frit used and clay alone, the steps which consist in milling with water a mixture of a white frit 100 parts by weight and about 13 parts of an opacifier comprising zirconium dioxide and zinc oxide in the ratio of 3 to 1, said mixture being ground to particle fineness of less than 44 microns to form the enamel slip, and applying said slip to said ware which upon drying and firing will produce aforesaid white vitreous coating characterized also as having a highly lustrous surface and fine texture.

13. In the method of making white vitreous enamel ware having a coating less in weight than 40 grams per square foot and a reflectance above 70 and substantially greater than that producible with the frit used and clay alone, the steps which consist in milling a white frit mixed with from 10 to 20 parts by weight of an opacifier selected from the dioxides of the group consisting of zirconium, tin, titanium, hafnium, thorium and cerium to 100 parts of said frit in water, said mixture being ground to a particle fineness of less than 44 microns to form the enamel slip, and applying said slip to said ware in a thin film which upon drying and firing will produce the aforesaid white vitreous coating having an opacifier content of more than 16 percent.

14. The method of making white vitreous enamel ware with coatings less in weight than 40 grams per square foot and having a reflectance above 70 and substantially greater than that producible with the frit used and clay alone, which comprises milling a mixture containing 100 parts by weight of a white frit, clay, water and not less than 10 parts by weight of an opacifier selected from the dioxides of the group consisting of zirconium, tin, titanium, hafnium, thorium and cerium, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

15. The method of making white vitreous enamel ware with coatings less in weight than 40 grams per square foot and having a reflectance above 70 and substantially greater than that producible with the frit used and clay alone, which comprises milling a mixture containing 100 parts by weight of a white frit, clay, water and from about 10 to 20 parts by weight of an opacifier selected from the dioxides of the group consisting of zirconium, tin, titanium, hafnium, thorium and cerium, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

16. The method of making white vitreous enamel ware with coatings less in weight than 40 grams per square foot and having a reflectance above 70 and substantially greater than that producible with the frit used and clay alone, which comprises milling a mixture containing 100 parts by weight of a white frit, clay, water and not less than 10 parts by weight of zirconium dioxide, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

17. The method of making white vitreous enamel ware with coatings less in weight than 40 grams per square foot and having a reflectance above 70 and substantially greater than that producible with the frit used and clay alone, which comprises milling a mixture containing 100 parts by weight of a white frit, clay, water and from about 10 to 20 parts by weight of zirconium dioxide, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

18. The method of making white vitreous enamel ware with coatings less in weight than 40 grams per square foot and having a reflectance above 70 and substantially greater than that producible with the frit used and clay alone, which comprises milling a mixture containing 100 parts by weight of a white frit, clay, water and not less than 10 parts by weight of zirconium dioxide and from 3 to 5 parts of zinc oxide essentially free from lead and sulfur compounds, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

19. The method of making white vitreous enamel ware with coatings less in weight than 40 grams per square foot and having a reflectance above 70 and substantially greater than that producible with the frit used and clay alone, which comprises milling a mixture containing 100 parts by weight of a white frit, clay, water and from about 10 to 20 parts by weight of zirconium dioxide and from 3 to 5 parts of zinc oxide essentially free from lead and sulfur compounds, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

CHARLES J. KINZIE.
CHARLES H. COMMONS, JR.

CERTIFICATE OF CORRECTION.

Reissue No. 22,011. January 20, 1942.

CHARLES J. KINZIE, ET AL.

It is hereby certified that error appears in the printed specification of the above numbered patent requiring correction as follows: Page 1, first column, line 42, for "load" read --lead--; page 4, first column, line 50, for "a various" read --at various--; and that the said Letters Patent should be read with this correction therein that the same may conform to the record of the case in the Patent Office.

Signed and sealed this 17th day of March, A. D. 1942.

Henry Van Arsdale, (Seal) Acting Commissioner of Patents.